United States Patent
Jocha et al.

(10) Patent No.: US 8,774,009 B2
(45) Date of Patent: Jul. 8, 2014

(54) METHODS AND ARRANGEMENT IN A MPLS-TP TELECOMMUNICATIONS NETWORK FOR OAM FUNCTIONS

(75) Inventors: Dávid Jocha, Budapest (HU); András Kern, Budapest (HU)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 124 days.

(21) Appl. No.: 13/386,174

(22) PCT Filed: Jul. 24, 2009

(86) PCT No.: PCT/EP2009/059614
§ 371 (c)(1),
(2), (4) Date: Feb. 16, 2012

(87) PCT Pub. No.: WO2011/009494
PCT Pub. Date: Jan. 27, 2011

(65) Prior Publication Data
US 2012/0163190 A1    Jun. 28, 2012

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ........ 370/241.1; 370/216; 370/217; 370/218; 370/221; 370/241

(58) Field of Classification Search
CPC ..... H04L 12/4633; H04L 43/04; H04L 45/22; H04L 45/28; H04L 45/50; H04L 45/502; H04L 65/80; H04L 41/00; H04L 41/0654; H04L 43/00

USPC ........ 370/216–218, 221–228, 241–252, 469, 370/522; 709/224
See application file for complete search history.

(56) References Cited

U.S. PATENT DOCUMENTS

2009/0052444 A1* 2/2009 Ringen .......................... 370/389
2010/0238788 A1* 9/2010 Boutros et al. ................ 370/216

OTHER PUBLICATIONS

Bocci, M. et al. "MPLS Generic Associated Channel", Internet Engineering Task Force, IETF, Standard, Internet Society (ISOC) 4, Geneva, Switzerlands, Jun. 1, 2009, XP015065601.*

(Continued)

*Primary Examiner* — Awet Haile
*Assistant Examiner* — Eric Myers
(74) *Attorney, Agent, or Firm* — Coats and Bennett, P.L.L.C.

(57) ABSTRACT

Extensions to a Multi-Protocol Label Switching (MPLS) frame forwarding procedure in an MPLS node are described. A context descriptor is defined for each frame received on a connection terminated at that node, and where this context descriptor is provided together with the frame to a corresponding function (e.g. Operations, Administration and Maintenance, OAM) if needed. The context descriptor is constructed based on key attributes characterizing the terminated connection, over which the frame is received, and addresses a particular function endpoint (Maintenance Endpoints (MEPs), Selector Bridge of a protection instance etc.) of a corresponding function (OAM, protection, etc.). In one embodiment, a Multi-Protocol Label Switching (MPLS) node is directed to check not only the first but also the second label, and not to drop the first label (and the label space if relevant) when the second label is the Generic Association Channel Label (GAL). In this way, the original context of the packet is kept (i.e. the information relating to the connection over which the packet was received), and can be used for de-multiplexing to the corresponding MEP. Then the identifiers within the OAM payload can be used for verification of the connectivity. Other embodiments describe alternative solutions.

30 Claims, 7 Drawing Sheets

(56) References Cited

OTHER PUBLICATIONS

Bocci, M. et al. "MPLS Generic Associated Channel", Internet Engineering Task Force, IETF, Standard, Internet Society (ISOC) 4, Geneva, Switzerland, Jun. 1, 2009, XP015065601.*

Boutros S. et al. "Connection Verification for MPLS Transport Profile LSP." Internet Engineering Task Force, IETF, Standard Working Draft, Internet Society (ISOC) 4, Geneva, Switzerland, No. 1, Mar. 9, 2009, XP015060454.

Bocci, M. et al. "MPLS Generic Associated Channel." Internet Engineering Task Force, IETF, Standard, Internet Society (ISOC) 4, Geneva, Switzerland, Jun. 1, 2009, XP015065601.

Aggarwal, R. et al. "MPLS Upstream Label Assignment and Context-Specific Label Space." Standards Track, Network Working Group, P29473 rfc5331, Aug. 2008, pp. 1-12.

Rosen, E. et al. "Multiprotocol Label Switching Architecture." Standards Track, Network Working Group, RFC 3031, Jan. 2001, pp. 1-61.

Vigoureux, M. et al. "Requirements for OAM in MPLS Transport Networks." Internet-draft of the Multiprotocol Label Switching Working Group of the IETF, Mar. 9, 2009, pp. 1-2.

Boutros, S. et al. "Connection Verification for MPLS Transport Profile LSP." Internet-draft, Mar. 9, 2009, pp. 1-2.

Busi, I. et al. "MPLS-TP OAM Framework and Overview draft-ietf-mpls-tp-oam-framework-00.txt." Internet Draft, MPLS Working Group, Mar. 26, 2009, pp. 1-28.

Fulignoli, A. et al. "MPLS-TP Proactive Continuity and Connectivity Verification draft-fhbs-mpls-tp-cv-proactive-00.txt." Internet Draft, MPLS Working Group, Feb. 9, 2009, pp. 1-21.

Busi, I. et al. "MPLS-TP OAM based on Y.1731 draft-bhh-mpls-tp-oam-y1731-02.txt." Internet Draft, Standard Track, MPLS Working Group, Mar. 24, 2009, pp. 1-19.

Takahashi, Kentaro, "MPLS-TP, Main Target of the Next Generation Transportation Technology, Aggregation of IP/Ethernet System and Legacy System", Nikkei Communications, May 1, 2009, pp. 38-42, No. 533.

* cited by examiner

METHODS AND ARRANGEMENT IN A MPLS-TP TELECOMMUNICATIONS NETWORK FOR OAM FUNCTIONS

TECHNICAL FIELD

The present invention relates to telecommunications networks and particularly, but not exclusively, to a method and arrangement for addressing maintenance points in a node of a packet-switched transport network.

BACKGROUND

Multi-Protocol Label Switching (MPLS) is a mechanism in telecommunication networks which directs and carries data packets from a node to other nodes. Each data packet comprises a label stack, on which forwarding decisions are made without the need to consult the remaining part of the packet.

Based on the existing MPLS forwarding plane, the Multi-Protocol Label Switching Transport Plane (MPLS-TP) aims to provide a framework to fulfill transport network requirements. One key area is to have a well-defined Operations, Administration and Maintenance (OAM) function set. This OAM function set is under standardization in the Internet Engineering Task Force (IETF). The OAM framework and requirements define several functions (Continuity Check (CC), Connectivity Verification (CV), Management Signals, etc.) that should be supported by the developed OAM solution.

The operation of OAM for MPLS-TP is that the necessary OAM attributes (identifiers, timers, counters, etc.) are encoded in so called OAM frames that are multiplexed into the data flow. In this way fate sharing of the OAM frames and data flow is ensured, that is, the OAM frames and data flow experience the same process in being forwarded from one node to another. The OAM frames are generated and received by Maintenance EndPoints (MEPs) that reside at the endpoints of a connection.

Currently, the MPLS-TP architecture consists of three layers: Pseudowire (PW), Label-Switched Path (LSP) Tunnel (connection) and Section (data link) layers. The MPLS-TP OAM is supposed to support all three layers.

Currently, several competing solutions of encoding the OAM parameters are proposed. However, these solutions are based on the same method of multiplexing the OAM frames into the data flows. The method defines an associated channel to carry the OAM frames and other control/management frames. In the case of PWs, these channels are identified and de-multiplexed using only the Generic Associated Channel Header (G-ACH). In the case of LSP tunnels and sections, an additional label is defined to indicate the associated channels. This label is referred to as the Generic Association Channel Label (GAL). The egress side (i.e. the destination side) detects and de-multiplexes the OAM frames based on these labels.

However, these solutions relying on transmitting OAM frames within the G-ACH have the following problem in MPLS and MPLS-TP: in the case of LSP Tunnel and Section layers, the standard MPLS data forwarding mechanism does not provide sufficient method to address the MEPs from the data plane using identifiers being used for data plane forwarding as well.

The standard MPLS forwarding behaviour at a particular node is as follows. Based on the first label in the stack (the tunnel label) the node looks up a Next Hop Label Forwarding Entry (NHLFE). This entry instructs the node what to do with the label stack (pop the first label, change the value of the first label, push a new label on the top of the stack etc.) and where to forward the packet (next-hop node).

If the node is an egress node that terminates a connection, the NHLFE is encoded to instruct the node to remove, i.e. pop, the tunnel label from the stack and to perform a lookup on the remaining packet. If any further labels exist on the stack, a second independent lookup for the next label on the stack is performed. This second label can be a GAL, for example, meaning that the packet should be passed to the control function of the local node, and the GAL removed from the frame. Then, the control function of that node can process the frame and send the OAM packet to the proper MEP.

Figure 1:
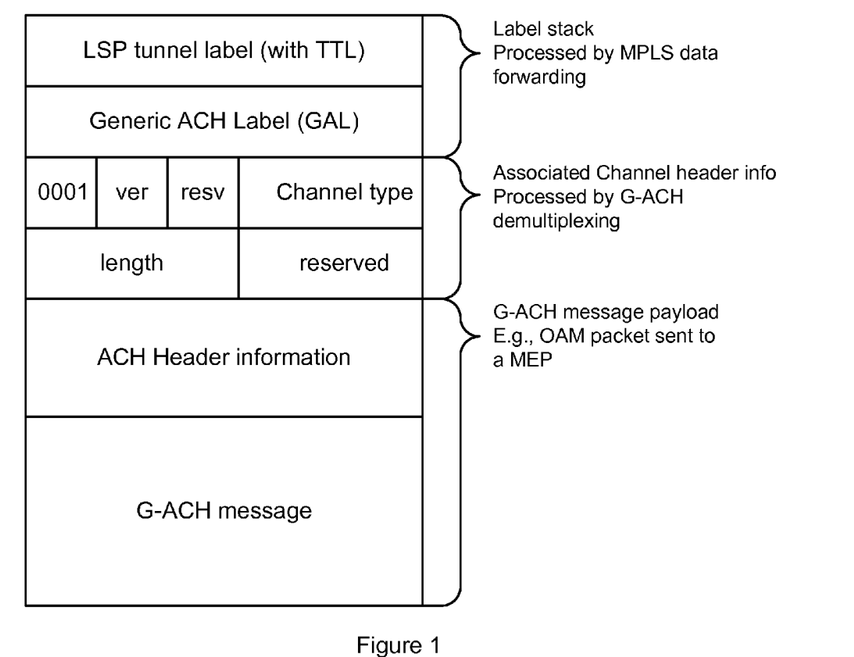
FIG. 1 shows a MPLS packet structure.

FIG. 1 shows a MPLS packet structure that may be used in the forwarding mechanism described above. A label stack comprises, for example, an outermost label which is a LSP tunnel label. This may either take the form of a label which explicitly identifies an egress node, or the form of a Time-To-Live (TTL) label which determines the egress node based on the number of hops. An associated channel header contains information which is processed by a G-ACH de-multiplexing process, while the G-ACH message payload contains the payload of the packet, for example an OEM payload to be sent to a MEP.

It will therefore be appreciated that the MPLS data plane does not allow a particular MEP to be addressed using data plane attributes (for example labels in the data plane). Instead, a MEP may only be addressed by de-multiplexing the OAM payload and using identifiers (i.e. routing information) within the OAM payload to address the appropriate MEP.

After de-multiplexing to the corresponding MEP, the correct connectivity should be verified using identifiers contained in the OAM payload. Although these identifiers are unique at either the node or the network level, the connection over which the packet was received cannot be identified, i.e. the incoming connection cannot be identified if multiple parallel connections exist between the ingress and the egress node. Furthermore, as described above neither the tunnel label (first label) nor the incoming interface are available after the OAM payload has been de-multiplexed. This means that it is not possible to verify the correct connectivity, i.e. not possible to perform a full Connectivity Verification (CV) operation.

A known solution proposed for MPLS-TP OAM connectivity verification is a linktrace-based method. However, this solution involves complex processing, not only at the end-points of a connection but also at all intermediate nodes that forward a connection, because the method was originally designed for a different function. This has the disadvantage of consuming an undesirable amount of processing resources. The linktrace-based method also has the disadvantage of not being easily scalable.

SUMMARY

The invention proposes extensions to the existing Multi-Protocol Label Switching (MPLS) frame forwarding procedure in an MPLS node, where a context descriptor is defined for each frame received on a connection terminated at that node, and where this context descriptor is provided together with the frame to a corresponding function (e.g. Operations, Administration and Maintenance, OAM) if needed. The context descriptor is constructed based on key attributes characterizing the terminated connection, over which the frame is received, and addresses a particular function endpoint (Maintenance EndPoints (MEPs), Selector Bridge of a protection instance etc.) of a corresponding function (OAM, protection, etc.). As such, a context descriptor will contain some key attribute that characterizes (i.e. identifies) the terminated connection, for example the connection over which a frame is received.

In one embodiment, a Multi-Protocol Label Switching (MPLS) node is directed to check not only the first but also the second label, and not to drop the first label (and the label space if relevant) when the second label is the Generic Association Channel Label (GAL). In this way, the original context of the packet is kept (i.e. the information relating to the connection over which the packet was received), and can be used for de-multiplexing to the corresponding MEP. Then the identifiers within the OAM payload can be used for verification of the connectivity.

For example, in one embodiment the invention provides a method in a node of a Multi-Protocol Label Switching (MPLS) telecommunications network. The method comprises the steps of receiving a MPLS frame, the MPLS frame having a label stack comprising one or more labels, and determining whether the frame has reached its terminating node. If the frame has reached its terminating node, a second label in the label stack is checked to determine whether the second label relates to a Generic Associated Channel Label (GAL). If so, a context descriptor is acquired for use during further processing of the frame, and the frame routed for Generic Associated Channel Header (G-ACH) processing.

In another embodiment, the expiration of a Time-To-Live (TTL) value is used. Here the hop distance of the destination MEP is known by the source MEP either by configuration or by measurement. The TTL value of the consequent frames containing the OAM messages will be set accordingly. Therefore, these frames will suffer TTL-expiration at the destination node resulting forwarding the whole frames containing the OAM packets to the control function of the destination node. Then, the full context of the frame, including the labels is present and can be used to address the corresponding MEP.

In yet another embodiment dedicated label spaces are specified per monitored connections and the label spaces are used to address the MEPs.

According to another embodiment of the invention, there is provided a node of a Multi-Protocol Label Switching (MPLS) telecommunications network. The node comprises receiving means for receiving a MPLS frame, the MPLS frame having a label stack comprising one or more labels. The node is configured to determine whether the frame has reached its terminating node and, if so, check a second label in the label stack to determine whether the second label relates to a Generic Associated Channel Label (GAL). If so, the node is configured to acquire a context descriptor for use during further processing of the frame, and to route the frame for Generic Associated Channel Header (G-ACH) processing.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

The embodiments below will be described in the context of performing Operations, Administration and Maintenance (OAM) functions at a node, and using identifiers in the OAM payload to enable a connection verification to be performed. It is noted, however, that the invention is applicable more generally than just performing OAM functions, and also more generally than just verifying the connection over which a frame is received.

Figure 2:
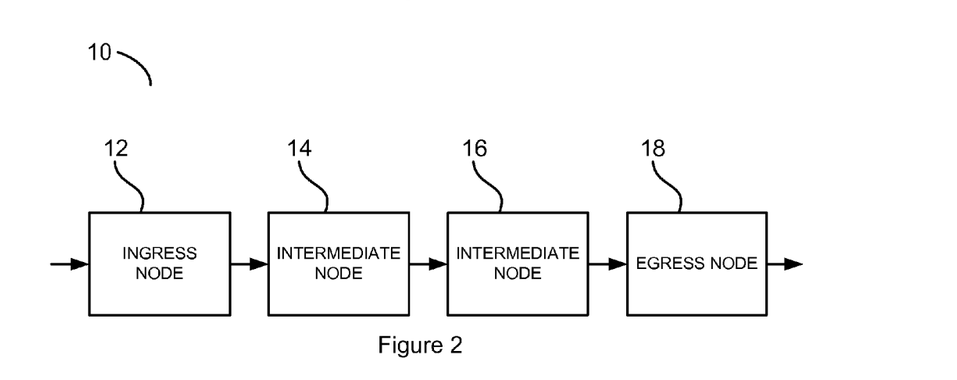
FIG. 2 illustrates part of a packet-switched network.

FIG. 2 illustrates part of a packet-switched network 10.

An MPLS-capable ingress node 12, acting as a Label Edge Router ("LER"), sends a label-switched flow of packet traffic, e.g., Internet Protocol (IP) traffic, through intermediate nodes 14, 16, each acting as a label-switching router ("LSR"), to an egress node 18.

Each flow of the traffic between the successive nodes 12, 14, 16, 18 is tagged, or labelled, with a unique label that identifies each flow between two adjacent nodes as a member of a particular "forward equivalence class" ("FEC") directed to a particular, successive, or "downstream," LSR. The label forms part of a "label stack", which may have one or more labels. Each downstream LSR receives the traffic and reads the first label in the label stack. It then matches the label with an entry in its respective Incoming Label Map (ILM) table indicating which NHLFE is to be applied, and reads the referred entry from the Next-Hop Label Forwarding Entry (NHLFE) table, and follows the forwarding directions associated in the table with that entry. The NHLFE table therefore describes how to treat the frame (for example forward, remove outer label, send to node Y, etc.) and for an intermediate LSR node 14, 16 will comprise at least the packet's next hop, and an operation to be performed on the label stack.

The nodes 12, 14, 16, 18 can define a Label-Switched Path (LSP) tunnel. In such a scenario, the first label on each packet forwarded between the ingress node 12 and the egress node 18 is a tunnel label identifying the tunnel path 12→14→16→18. At the egress node 18, according to the prior art, the tunnel label is popped from the label stack (i.e. removed from the label stack), and the packet is forwarded to its next destination node based on the second label or based on the content of a packet if no such secondary label exists in the label stack. In the case where the second label is a Generic Association Channel Label (GAL), the packet may be forwarded to a Generic Associated Channel Header (G-ACH) processing function of the node 18, and in the example of a OAM function from there to a Maintenance End Point (MEP). However, the tunnel label is lost.

According to the invention the existing Multi-Protocol Label Switching (MPLS) frame forwarding procedure is extended in an MPLS node, whereby a context is defined for each frame received on a connection terminated at that node, and where this context is provided together with the frame to a corresponding function (e.g. OAM) if needed. The context is constructed based on key attributes characterizing the terminated connection, over which the frame is received, and addresses a particular function endpoint (for example Maintenance Endpoints (MEPs), Selector Bridge of a protection instance etc.) of a corresponding function (OAM, protection, etc.).

In a first embodiment, an MPLS node is directed to check not only the first but also the second label, and not to drop the first label (and the label space if relevant) when the second label is the Generic Association Channel Label (GAL). In this way, the original context of the packet is kept (i.e. the information relating to the connection over which the packet was received), and can be used for de-multiplexing to the corresponding MEP. Then the identifiers within the OAM payload can be used for verification of the connectivity. It is noted that the label space is considered to be relevant if context specific label spaces or per interfaces label spaces are used, in which case the label value alone cannot identify the connection fully.

Figure 3:
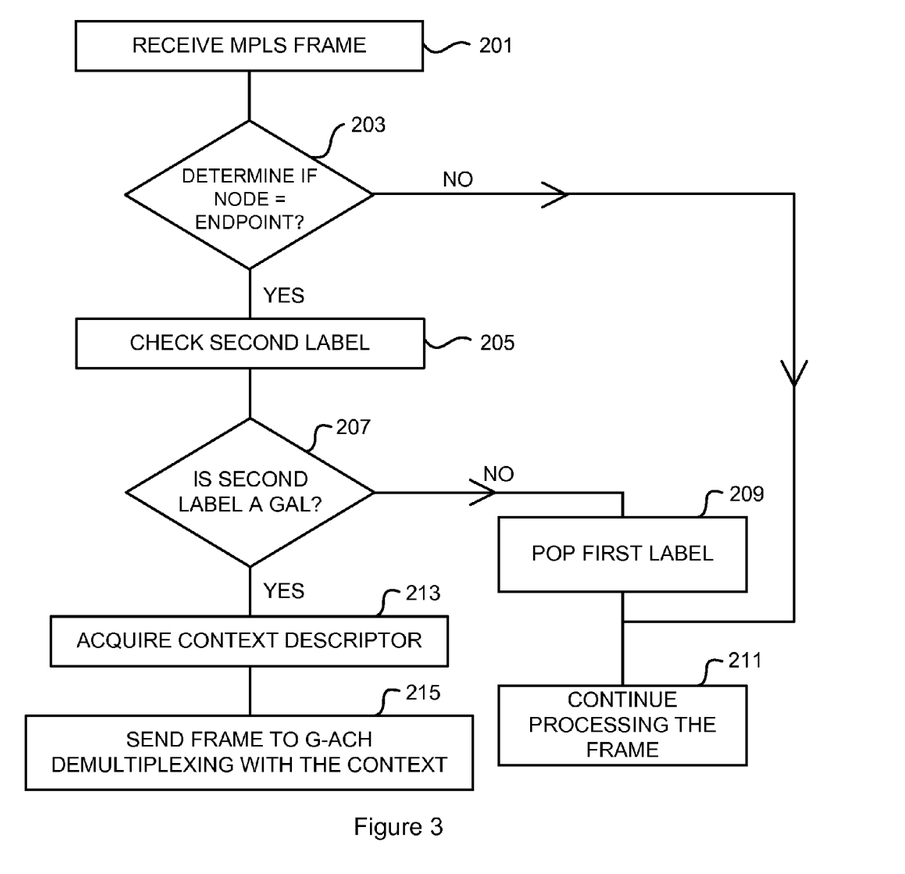
FIG. 3 is a flowchart describing the steps of a method in accordance with an embodiment of the invention.

FIG. 3 shows the steps performed by the invention according to an embodiment of the invention. In step 201 a node receives an MPLS frame. The frame is then checked in step 203 to determine whether the node is the endpoint of the LSP tunnel, i.e. the egress node. For example, in one embodiment (described in greater detail in FIG. 4 below), the first label of the MPLS frame is checked in step 203, with the first label indicating that the node is the endpoint of the LSP tunnel. According to another embodiment (described in greater detail in FIG. 5 below), Time-To-Live (TTL) information received in the MPLS frame is used to determine whether the node is the endpoint of the LSP tunnel.

If it is determined in step 203 that the node is not the endpoint of the LSP tunnel, then processing of the frame continues in the normal manner in step 211, for example checking the next hop and forwarding the frame accordingly.

If it is determined in step 203 that the node is the endpoint of the LSP tunnel, then the second label of the MPLS frame is also checked, step 205. It is determined whether the second label is a GAL, step 207.

If it is determined in step 207 that the second label is not a GAL, then the MPLS frame is handled in a conventional manner, whereby the first label is popped, step 209, and processing of the frame then continues in the normal manner in step 211, for example checking the next hop and forwarding the frame accordingly.

However, if it is determined in step 207 that the second label is a GAL then, in step 213, a context descriptor is acquired based on attributes of the forwarding procedure. For example, this context descriptor can be formed using the tunnel label (i.e. first label) and the label space, or using the NHLFE key value. Once the context descriptor has been acquired the MPLS frame may then be processed in a conventional manner, by sending the frame to a higher layer in step 215, for example by sending the frame to a G-ACH de-multiplexing operation together with the context descriptor acquired in step 213. The acquired context descriptor in step 213 is retained and may be used for future processing, such as Connection Verification (CV), Continuity Checking (CC), or other functions where the identity of the origin of the frame may be required.

Figure 4:
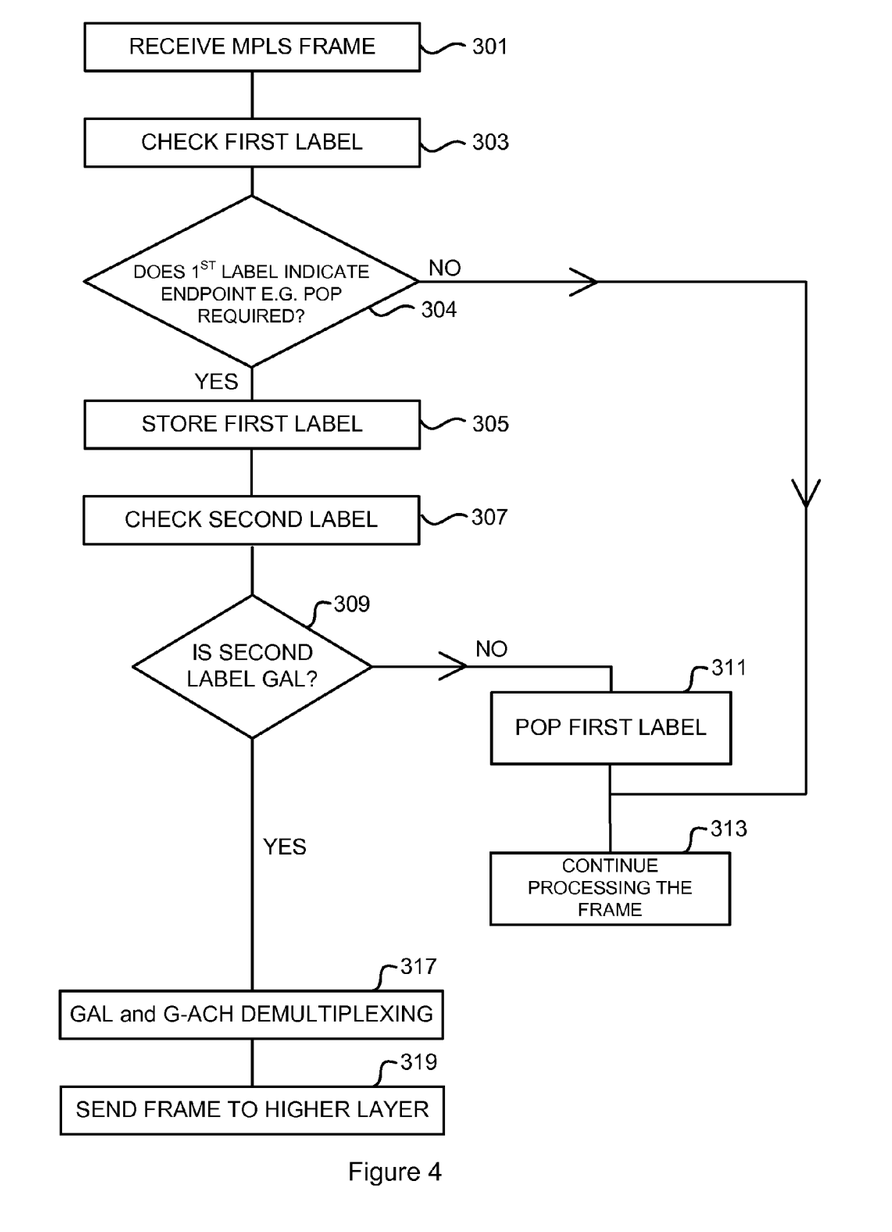
FIG. 4 is a flowchart describing the steps of a method in accordance with another embodiment of the invention.

As mentioned above, one method of acquiring a context descriptor is to store a first label which would otherwise be lost during a pop operation performed on the first label. FIG. 4 shows the steps performed in such an embodiment of the invention. In step 301 a node receives an MPLS frame. The first label of the MPLS frame is then checked, step 303. In step 304 it is determined whether the first label indicates that the node is an endpoint, for example by determining that a POP operation is to be performed. If it is determined in step 304 that the node is not an endpoint in the LSP tunnel, processing of the MPLS frame then continues in a conventional manner in step 313, for example checking the next hop and forwarding the frame accordingly.

If the first label indicates that the node is an endpoint, then according to this embodiment the first label is then stored, step 305. The second label of the MPLS frame is then checked, step 307, and it is determined whether the second label is a GAL, step 309.

If it is determined in step 309 that the second label is not a GAL, then in step 311 the first label is popped, which results in the first label being dropped. Processing of the MPLS frame then continues in a conventional manner in step 313, for example checking the next hop and forwarding the frame accordingly.

However, if it is determined in step 309 that the next label is a GAL, the MPLS frame may then be processed in a conventional manner, for example by de-multiplexing the GAL and G-ACH, step 317, and then sending the MPLS frame to a higher layer, step 319, but without dropping the first label that was previously stored in step 305. It will therefore be appreciated that the storing of the first label in step 305 enables the context of the incoming frame to be acquired and retained for future processing, such as verifying a connection or continuity checking. The first label may be stored by storing a copy of the label value in a specific memory that is different from the label stack. Alternatively, the first label may be stored in a memory that is provided for storing a label stack history, such that the history therefore provides the desired context. It is noted that it is sufficient to store only the last processed label in history for this purpose.

Although the embodiment of FIG. 4 shows the first label being stored prior to the second label being checked, it is noted that the first label may be stored at other instances, or in other ways, provided it is stored before the first label is popped, and provided it can be retained after the first label has been popped.

In one example of an application, the embodiments described in FIGS. 3 and 4 may involve de-multiplexing an OAM payload, and then directing the frame to a desired MEP. It will be appreciated, however, that the invention is also applicable to other applications where the context of the incoming frame is required, the context being based on key attributes characterizing the terminated connection over which the frame is received.

Figure 5:
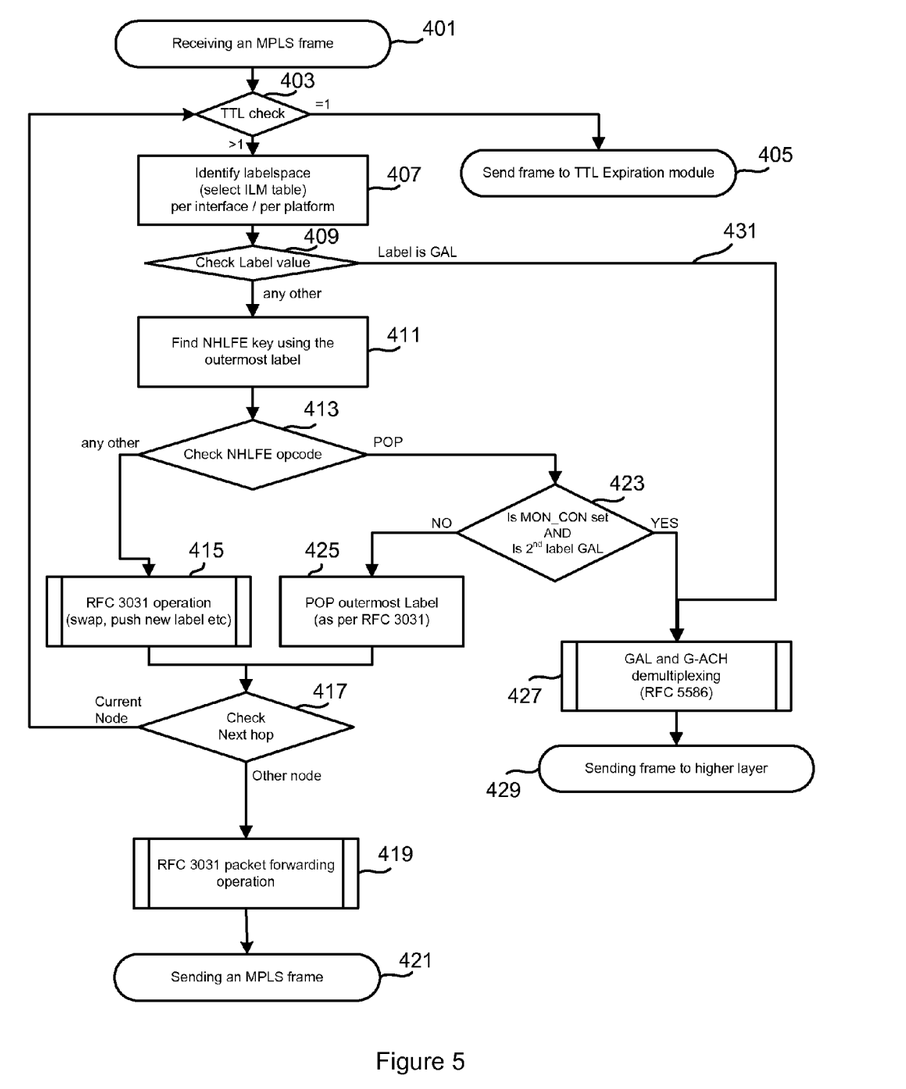
FIG. 5 is a flowchart describing the steps of a method in accordance with another embodiment of the invention.

FIG. 5 is a flowchart showing a more detailed application of the invention in an egress node 18 according to an embodiment of the invention. The embodiment shows how a generic MPLS data plane operation (for example Internet Engineering Task Force (IETF) RFC 3031) can be extended.

In step 401 an MPLS frame is received. The embodiment is shown as having a Time-To-Live (TTL) mechanism operating in conjunction with the invention. The TTL mechanism is provided in an MPLS system to indicate how many hops a frame must perform before reaching its desired destination. It can be used, for example, to ensure that a misconfigured loop (e.g. ring shaped LSP) does not result in a frame being forwarded forever. As such, in step 403 it is first determined whether a Time-To-Live (TTL) value has reached a predetermined value, for example 1, indicating that the frame has expired. If so, the frame is sent to a TTL expiration module, step 405, and handled in a conventional manner for such expired frames. It is noted that the use of a TTL mechanism is not essential to the embodiment of FIG. 5.

Assuming that the received frame has not expired, the label space is identified in step 407. This step may include identifying the appropriate Incoming Label Map (ILM) table for handling that particular frame. An ILM table is defined per label space. Based on node configuration a label space value is assigned to each received frame, which enables an ILM table to be selected. For example, a particular label space can be defined for a particular interface and a second label space for a set of other interfaces—thereby giving two ILM tables.

Next, in step 409 the label value of the first label in the label stack is checked. If the first label is not a GAL (for example because the GAL is the second label in the label stack) then processing moves to step 411. In step 411 the NHLFE key is found using the first label, i.e. the outermost label. The NHFLE key identifies a specific NHFLE in the NHLFE table. The NHFLE key can be, for example, a row number. In step 413 the NHLFE opcode (i.e. retrieved by the NHFLE key in step 411) is checked to determine the nature of the NHFLE opcode.

If it is determined in step 413 that the NHFLE opcode is anything other than a POP opcode, (for example a swap, push new label etc.) opcode, then processing moves to step 415. The next hop is then checked, step 417. If the next hop is indicated as being to the same node, then processing returns to step 403 where the procedure starts again. If it is determined in step 417 that the next hop is indicated as being to another node, then the frame is handled according to the RFC 3031 packet forwarding operation, step 419, and the frame then sent accordingly, step 421.

If it is determined in step 413 that the NHFLE opcode is a POP opcode, then in step 423 it is determined if a MONITORED_CONNECTION (MON_CON) status bit is set and the second label in the label stack is a GAL. It is noted that the (MON_CON) bit is an optional feature that may be provided to indicate that a connectivity check may be required at some point during subsequent processing of the frame, such that the context (e.g. first label) needs to be stored). The MON_CON bit therefore acts as an indication to "peek" the second label to determine whether the second label is a GAL. The MON_CON status bit is located in the NHLFE (and may be considered as an attribute of an entry in the NHLFE table).

If it is determined in step 423 that the MON_CON bit is not set or the second label is not a GAL, then processing passes to step 425, where the first label is popped (for example as per RFC 3031), and processing then moves to step 417 where the next hop is checked. It is noted that in a conventional system the processing would simply move from step 413 to step 425 when the NHFLE is determined to be a POP opcode in step 413.

Processing from step 425 then proceeds as described above. That is, if it is determined in step 417 that the next hop is indicated as being to the same node, then processing returns to step 403 where the procedure starts again. If it is determined in step 417 that the next hop is indicated as being to another node, then the frame is handled according to the RFC 3031 packet forwarding operation, step 419, and the frame then sent accordingly, step 421.

Returning to step 423, if it is determined that the MON_CON bit is set and the second label is a GAL, then processing moves to step 427 where the GAL and G-ACH are de-multiplexed (for example according to RFC 5586), and the frame then sent to a higher layer, step 429. As such, the first label is not popped, which means that the first label will still be available to the system for future use, for example verifying a connection, continuity checking, etc. The first label may be retained in memory where it was stored while awaiting to be popped in step 425, or stored elsewhere for future processing. It is noted that the embodiment described above avoids a further lookup to identify the GAL as a top-of-the-stack label, which would otherwise normally be required.

When used in an application relating to OAM payloads, the de-multiplexing and sending steps 427, 429 may comprise de-multiplexing an OAM payload and sending a frame to a MEP.

It will therefore be appreciated from the above that, if the first label and the label space are available at step 423, the first label and the label space can be passed as part of the context descriptor to the G-ACH processing function of step 427. There may be situations in which the first label or the label space may be lost by the time processing reaches step 423. However, if either the first label or the label space is already lost, the NHLFE can still provide the context, but in this latter case the NHLFEs must be dedicated to the connections, i.e. an NHLFE must not encode the forwarding behaviour of more than one connection endpoint. Such restrictions are available in MPLS-TP for other purposes.

Although not explicitly described in FIG. 5, the method may also comprise the step of checking an incoming label to determine if the first label is not at the bottom of the label stack. This can be provided as an initial check, thus saving unnecessary processing.

It will be appreciated that the embodiment described in FIG. 4 performs a form of "dual label check", i.e. checking the first label and then checking the second label. According to an implementation specific realisation option, instead of the dual label check the method may comprise the steps of keeping the original MPLS behaviour, and storing the removed first label and label space, thus incorporating a method similar to that of FIG. 4. In other words, the first label is stored until such time as the second label has been checked, and then dropping the first label if it is not needed, but keeping the first label if it is needed for future processing. For example, this stored context can be dropped after the second lookup and removing the second (GAL) label unless an OAM CV G-ACH is found. An alternate solution to this dropping is to check not only the first and second label, but also the possible OAM G-ACH and keep the first label and context only if it was found.

In this way the original context of the packet is available for the ACH processing function, and can be used for addressing the corresponding MEP. The identifiers within the OAM payload can then be used for verifying the connectivity or checking the continuity.

As can be seen from above, the embodiment of FIG. 5 may have an additional optional feature, whereby an additional flag in the form of a "MONITORED_CONNECTION" flag is provided in the corresponding NHLFE, which indicates that a check of the second label is needed. Such an explicit indication has the advantage of increasing the performance of the system as it performs checking of the secondary label only if necessary, rather than for every instance.

It is noted that during a setup procedure this flag can be either explicitly communicated from the source to the destination node (e.g. an optional TLV or a new bit can be used in the RSVP-Path message when setting up the LSP), or can be set based on deductions from the other received parameters (e.g., the configuration of OAM).

It will be appreciated that the invention as described in the embodiment of FIG. 5 has the advantage of keeping the first label, i.e. context descriptor, available for future processing, for example for performing a connection verification or continuity check.

Figure 6:
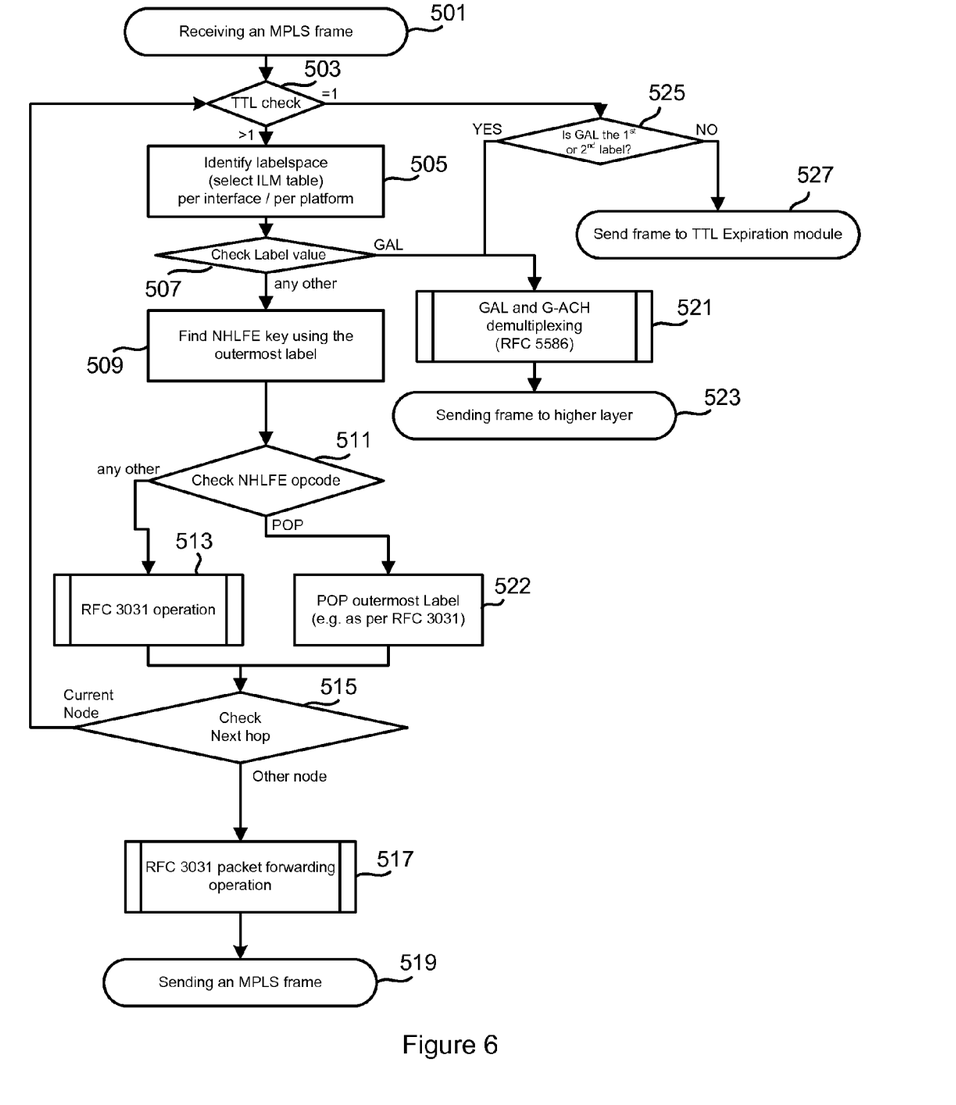
FIG. 6 is a flowchart describing the steps of a method in accordance with another embodiment of the invention.

FIG. 6 is a flowchart showing a method in the egress node 18 according to a further embodiment of the invention. As with FIG. 5, this embodiment shows how a generic MPLS data plane operation (for example Internet Engineering Task Force (IETF) RFC 3031) can be extended. The embodiment of FIG. 6 provides a new mechanism for identifying an associated channel by reusing the TTL-expiration mechanisms defined for MPLS.

In step 501 an MPLS frame is received. As with FIG. 5 the embodiment of FIG. 6 is shown as having a Time-To-Live (TTL) mechanism operating. The TTL mechanism is provided in an MPLS system to indicate how many hops a frame must perform before reaching its desired destination. Assuming that a source MEP knows the hop distance to the destination MEP, the source node sets the TTL field in the LSP identifying label to that hop-count for any frames carrying G-ACH messages. At the destination node TTL-expiration will occur and the whole context is available for the processing function. This is described in further detail below.

In step 503 it is first determined whether a Time-To-Live (TTL) value has reached a predetermined value, for example 1, indicating that the frame has expired. If so, processing is moved to step 525, where it is determined whether the GAL is the next (second) label. If the GAL is not the next (second) label, processing moves to step 527, whereby the frame is then sent to a TTL expiration module, and handled in a conventional manner for such expired frames.

If it is determined in step 525 that the GAL is the next (second) label, then processing moves to step 521, whereby the GAL and G-ACH are de-multiplexed (for example according to RFC 5586), and the frame then sent to a higher layer, step 523. At the ACH processing function of the destination node the full context of the packet, including the labels are present and can be used to address the corresponding MEP. This is because the GAL and G-ACH are de-multiplexed without a POP operation being performed on the outermost label, which would result in the context being lost. Then the identifiers contained within the OAM payload can be used, for example for verification of the connectivity or continuity checking.

If it is determined in step 503 that the received frame has not expired, indicating that the node is not the egress node, then the MPLS mechanism operates in a conventional manner, whereby the label space is identified in step 505. This step may include identifying the appropriate Incoming Label Map (ILM) table for handling that particular frame.

Next, in step 507 the first label value is checked. If the first label is not a GAL (for example because the GAL is the next (second) label in the label stack) then processing moves to step 509. In step 509 the NHLFE key is found using the outermost label. The NHFLE key identifies a specific NHFLE in the NHLFE table. The NHFLE key can be, for example, a row number. In step 511 the NHLFE opcode (i.e. retrieved by the NHFLE key in step 509) is checked to determine the nature of the NHFLE opcode.

If it is determined in step 511 that the NHFLE opcode is anything other than a POP opcode, (for example a swap, push new label etc.) opcode, then processing moves to step 513. The next hop is then checked, step 515. If the next hop is indicated as being to the same node, then processing returns to step 503 where the procedure starts again. If it is determined in step 515 that the next hop is indicated as being to another node, then the frame is handled, for example, according to the RFC 3031 packet forwarding operation, step 517, and the frame then sent accordingly, step 519.

If it is determined in step 511 that the NHFLE opcode is a POP opcode, then processing passes to step 522, where the first label is popped (for example as per RFC 3031), and processing then moves to step 515 where the next hop is checked. It is noted that step 522 may be incorporated as part of step 513.

Processing from step 515 then proceeds as described above. That is, if it is determined in step 515 that the next hop is indicated as being to the same node, then processing returns to step 503 where the procedure starts again. If it is determined in step 515 that the next hop is indicated as being to another node, then the frame is handled according to the RFC 3031 packet forwarding operation, step 517, and the frame then sent accordingly, step 519.

Thus, it will be appreciated from the above that the TTL-expiration processing function is extended by providing additional functions. First, it checks the second label on the stack if there are any, and if this second label is the GAL the frame is passed to the ACH processing function with the whole context.

It can also be seen from FIG. 6 that, if there is no TTL expiration, then the first label is removed and the forwarding is continued based on the second label. This second label can be e.g. GAL, meaning that the local node should process the packet. Then after removing the second label, a G-ACH is found with an OAM payload. However, at this step the first label, and the original context is already lost and cannot be used for connection verification. However, for continuity checks this legacy operation can still be used.

There are various alternatives that may be used to determine the hop count between the source and destination MEPs.

According to one embodiment the connection setup procedure can determine the hop count and provide this information to the source and destination nodes. This implementation depends on whether the connection setup is done in centralized (through management plane) or in distributed (through control plane) ways.

In centralized connection setup the entity that controls the setup procedure has a full view on the connection to be established. Therefore, it can calculate the hop distance based on the local knowledge and send it along with other configuration parameters to the endpoint MEPs.

In distributed connection setup the control plane protocol must provide a method to determine the hop-count. If GMPLS is used as a control plane for MPLS-TP the GMPLS connection provisioning protocol (RSVP-TE) must calculate the hop distance. One option is to apply the route record capability of the RSVP-TE. A second option is add a new hop-counter to the RSVP-TE signalling messages that calculates the number of physical hops of the MPLS-TP connection.

After connection establishment (but before connectivity verification) the source MEP sends a measuring frame where the TTL of this message is set to a well-known value, e.g. 250. The destination node can calculate its hop-distance from the source node by extracting the actual TTL value in the OAM message from the well-known value. Then the destination MEP can notify the source MEP on the result.

The already existing CC frames may be used for this purpose. Using these frames the destination MEP knows its distance from the source MEP. However, a new Distance Measurement Message may also be used; in this case this message indicates a measurement and a reply message are generated in response to it from the destination MEP.

Alternative methods may be used for sending this value back to the source MEP. One option is to extend the CC message that is replied by the destination MEP to the source MEP with an optional field carrying this value. According to another option, the value is sent back via a new Distance Measurement Reply message.

It is noted that, in the case of using the CC messages instead of a Distance Measurement Message, the destination MEP should be informed about when to send the measured distance back to the source. This may be achieved using one of the following options. One option is to send back only once, after receiving the first CC message. The second option is to send the measured distance back continuously unless notified from the source to stop; this notification may be the first CV message, or an additional bit in the CC message. It will be appreciated that the above mentioned options for measuring the hop distance assume that the path is correct or static until such time as the measurement has been completed.

Figure 7:
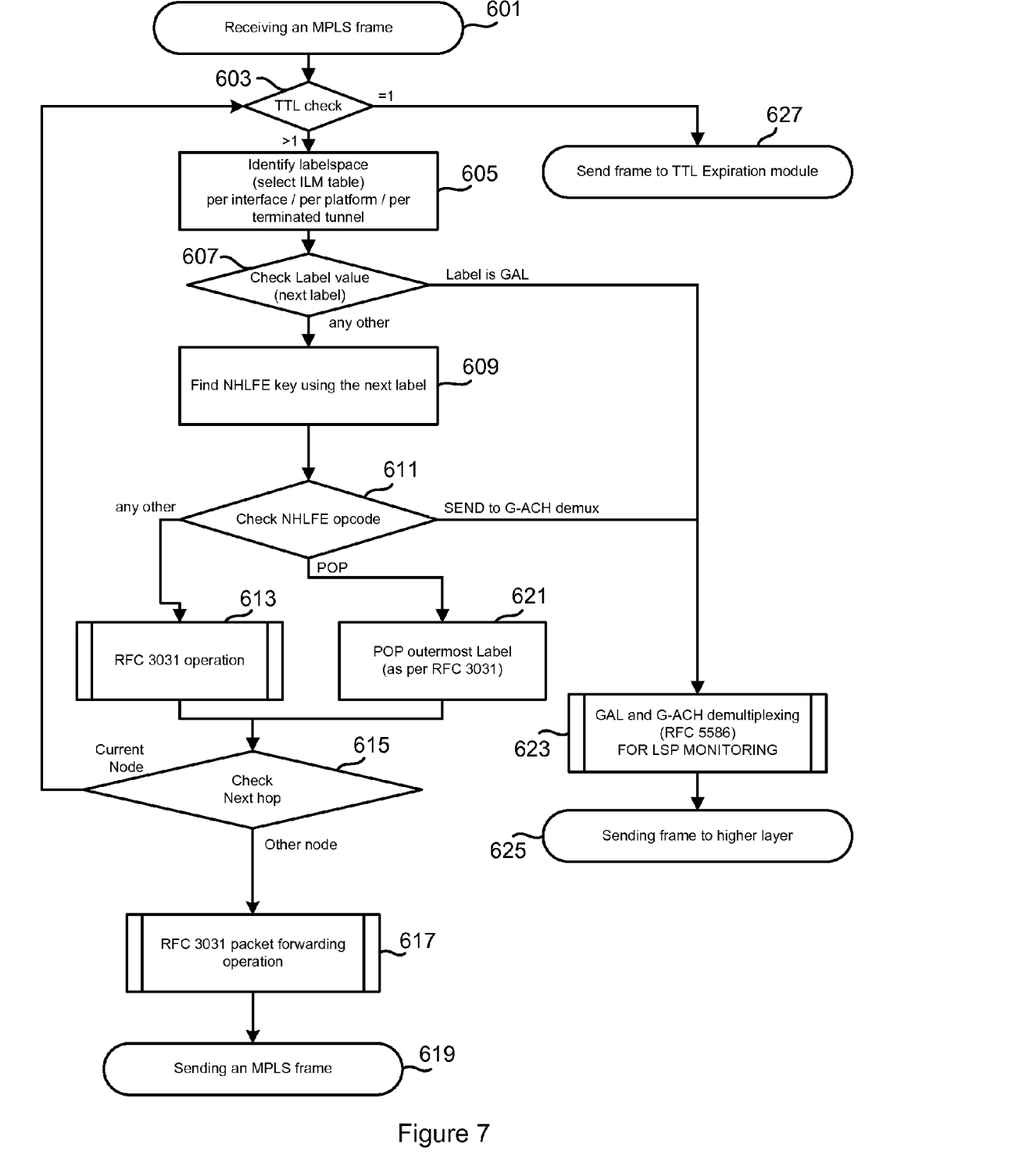
FIG. 7 is a flowchart describing the steps of a method in accordance another embodiment of the invention.

FIG. 7 is a flowchart showing a method in the egress node 18 according to another embodiment of the invention. As with FIGS. 5 and 6, this embodiment shows how a generic MPLS data plane operation (for example Internet Engineering Task Force (IETF) RFC 3031) can be extended. The embodiment of FIG. 7 specifies dedicated label spaces per monitored connections and the label spaces are used to address the MEPs. Thus, according to this embodiment the label space, to which the incoming connection belongs, identifies the context to address the MEPs. The RFC 3031 procedure, for example, defines per platform and per interface label spaces, while RFC 5331 is used to add the "context-specific label spaces".

A label space can be imagined as a numeric identifier that is meaningful only within the node. A specific label space identifier is assigned to a label value received on a specific interface. This means that each frame, which is received on that interface and carries the defined first label, belongs to that context-specific label space. Then, the first label can be pruned and a lookup carried out on the second label, for example a GAL. At this step the label space identifier will still be available and can be provided to the G-ACH de-multiplexing layer together with the frame. If the label space identifier is not available, then the NHLFE key may be used with certain restrictions.

This embodiment therefore defines a dedicated label space for a specific incoming label and specifies dedicated label mapping tables (ILM) for that label. A more detailed explanation is given below.

In step 601 an MPLS frame is received. As with FIGS. 5 and 6 the embodiment of FIG. 7 is shown as having a Time-To-Live (TTL) mechanism operating. In step 603 it is first determined whether a Time-To-Live (TTL) value has reached a predetermined value, for example 1, indicating that the frame has expired. If so, processing is moved to step 627, whereby the frame is then sent to a TTL expiration module, and handled in a conventional manner for such expired frames.

If it is determined in step 603 that the received frame has not expired, the label space is identified in step 605. This step may include identifying the appropriate Incoming Label Map (ILM) table for handling that particular frame. A label space defines the scope of a label value, i.e. the uniqueness of the label values is ensured only in a label space. In theory the label space and the label value together define the operation to be performed on the received frame. A label space may be bound to a node, to an interface of the node, or to a tunnel endpoint (i.e. with the label value identifying that tunnel).

As the first label in the stack defines the label space, next, in step 607 the value of the next (second) label is checked. In other words, rather than checking the label value of the first label which would normally take place at this stage of the MPLS operation, the label value of the next label (i.e. the second label) is checked instead. If the next (second) label is not a GAL then processing moves to step 609. In step 609 the NHLFE key is found using this next (second) label. The NHFLE key identifies a specific NHFLE in the NHLFE table. The NHFLE key can be, for example, a row number. In step 611 the NHLFE opcode (i.e. retrieved by the NHFLE key in step 609) is checked to determine the nature of the NHFLE opcode.

If it is determined in step 611 that the NHFLE opcode is anything other than a POP opcode, (for example a swap, push new label etc.) opcode, then processing moves to step 613. The next hop is then checked, step 615. If the next hop is indicated as being to the same node, i.e. the current node, then processing returns to step 603 where the procedure starts again. If it is determined in step 615 that the next hop is indicated as being to another node, then the frame is handled according to the RFC 3031 packet forwarding operation, step 617, and the frame then sent accordingly, step 619.

If it is determined in step 611 that the NHFLE opcode is a POP opcode, then processing passes to step 621, where the first label is popped (for example as per RFC 3031), and processing then moves to step 615 where the next hop is checked. It is noted that step 621 may be incorporated as part of step 613.

Processing from step 615 then proceeds as described above. That is, if it is determined in step 615 that the next hop is indicated as being to the same node, then processing returns to step 603 where the procedure starts again. If it is determined in step 615 that the next hop is indicated as being to another node, then the frame is handled according to the RFC 3031 packet forwarding operation, step 617, and the frame then sent accordingly, step 619.

In the embodiment of FIG. 7, although the exact value of the first label is lost, the first label defines the label space and the label space unambiguously identifies the connection itself. As such, the label space can be used to define the context descriptor. In other words, the first label describes the context and this context is used to address the MEPs. Therefore, the first label addresses the MEPs and the second label is only a GAL, and the second label indicates that the frame should be sent to the GAL and G-ACH de-multiplexing.

From the above it will be appreciated that the embodiment of FIG. 7 reuses procedure RFC 5331, for example, (derived from RFC 3031) to provide a dedicated label space (and a separate ILM table) to be allocated for each monitored connection. The egress node can determine which label space to use based on the criteria listed below. If the label space instance is bound to a node this "default" label space will be assigned to any received frames. If the label space instance is bound to an interface (port), then the node will assign this label space to any frames that are received on that interface/port. If the label space instance is bound to a tunnel endpoint, then the node will assign this label space to any frames received on that tunnel. The three label space classes may be allocated as per-node, per-interface and context-specific label spaces.

A connection-dedicated ILM table may contain:
- Label entries referring to client connections that are tunnelled through the monitored connection and are de-multiplexed at the node
- Label entries referring to the encapsulated Pseudo Wire flows.
- Label entry referring to the GAL (label value 13) if an associated channel is defined for the monitored connection.
- Label entry referring to the Explicit Null label (value 0) to define treatment for the non-encapsulated client flows.

It is noted that each entry in the ILM can refer to an NHLFE. Then an NHLFE addressed by the label entry for GAL of such a context label space can encode information of the context. In this way, the connection over which the frame is received can be identified and can be used to address the MEP. The connection information can also be used to perform subsequent operations, such as performing a connection verification.

Figure 8:
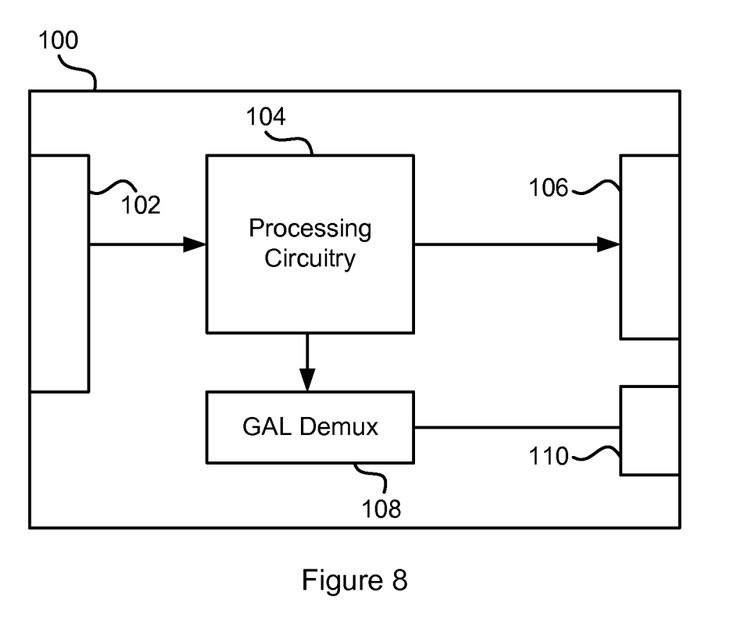
FIG. 8 is a schematic diagram of a node in accordance with embodiments of the invention.

FIG. 8 shows a node 100 of a packet-switched network according to embodiments of the invention. The node 100 is suitable for operation as the egress node 18 described with respect to FIG. 2.

The node 100 comprises receiving circuitry 102 for receiving packets of data traffic from connected nodes. The received packets are passed to processing circuitry 104, which processes the packets, for example in accordance with any of the methods described with respect to FIGS. 3 to 7. If it is determined that the received packet has a GAL label, the packet is passed to GAL de-multiplexing circuitry 108, which determines the appropriate operation to perform on the packet. For example, the GAL de-multiplexing circuitry 108 may forward the packet to a MEP through an interface 110 if the packet is identified as an OAM packet. If the received packet does not have a GAL label, the processing circuitry 104 may forward the packet to another node to which it is connected, through the interface circuitry 106. Thus, via interface circuitry 110 the OAM, protection functions etc., that provide further functionality for LSP and section layers may be connected. Via interface circuitry 106 other MPLS-TP nodes, or client equipment, for example, may be connected.

It will be appreciated that the various embodiments described above enable IETF BFD based, ITU-T Y.1731 based or a similar connection verification functions able to fulfill the requirements against MPLS-TP Connectivity Verification (CV) in the case of LSP Tunnel and Section layers. For example, unexpected connectivity between two MEs (for example mismerging or misconnection), where MEPs from each of the MEs are located on the same node becomes detectable when one of the proposals described in the embodiments above is used. Without these extensions the mentioned functions are unable to detect the error.

It is noted that all of the embodiments described above are applicable for solving the problem in the case of an LSP Tunnel layer. The embodiments of FIGS. 6 and 7 are applicable for solving the problem in the case of a Section layer.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method in a node of a Multi-Protocol Label Switching (MPLS) telecommunications network, the method comprising:
  receiving a MPLS frame, the frame having a label stack comprising a first label and a second label;
  determining whether the frame has reached its terminating node;
  in response to the determining that the frame has reached its terminating node, checking whether the second label in the label stack relates to a Generic Associated Channel Label (GAL);
  in response to the second label relating to a GAL, the node:
    acquiring a context descriptor constructed based on key attributes characterizing the terminated connection over which the frame has been received; and
    routing the frame for Generic Associated Channel Header (G-ACH) processing;
  wherein the context descriptor is retained by the node, separate from the frame, after the routing so that the context descriptor is available for use by an operations, administration, and maintenance (OAM) function during subsequent processing of the frame when performing connection verification (CV), continuity checking (CC), or other functions where the identity of the origin of the frame is required.

2. The method of claim 1 wherein the determining whether the frame has reached its terminating node comprises checking the first label in the label stack.

3. The method of claim 2 wherein the checking the first label in the label stack comprises checking whether the first label is associated with a pop operation.

4. The method of claim 1 wherein the determining whether the frame has reached its terminating node comprises checking time-to-live (TTL) information received with the frame.

5. The method of claim 1 wherein the storing the context descriptor comprises storing the first label for future processing by the OAM function.

6. The method of claim 5 wherein the storing the context descriptor further comprises storing label space information.

7. The method of claim 6 wherein the storing the context descriptor comprises:
  storing the first label and label space information prior to the second label being checked;
  retaining the first label and label space information when the second label is a GAL;
  dropping the first label and label space information when the second label is not a GAL.

8. The method of claim 6 wherein the storing the context descriptor comprises storing the first label and the label space information after determining that the second label is a GAL.

9. The method of claim 5 wherein the storing the context descriptor comprises storing the last processed label in a memory as a label stack history.

10. The method of claim 1 wherein the checking the second label is performed in response to a status bit being set in the received frame, the status bit indicating that the connection is a monitored connection.

11. The method of claim 1 wherein the context descriptor is stored based on information provided in a label space of the received MPLS frame, wherein a label space is allocated to each monitored connection.

12. The method of claim 11 wherein a separate incoming label map (ILM) table is provided for each label space.

13. The method of claim 11 wherein a label space for a monitored connection is used to address a Maintenance End-Point (MEP).

14. The method of claim 1 wherein storing the context descriptor comprises storing the context descriptor using a next hop label forwarding entry (NHLFE) key.

15. The method of claim 1 further comprising:
  de-multiplexing the received frame to obtain data relating to OAM functions;
  routing the frame to a Maintenance Endpoint (MEP) based on routing information contained in the de-multiplexed data;
  performing a connectivity check using the stored context descriptor.

16. A node of a Multi-Protocol Label Switching (MPLS) telecommunications network, the node comprising:
  receiving circuitry operative to receive a MPLS frame, the frame having a label stack comprising a first label and a second label;
  processing circuitry operatively connected to the receiving circuitry and configured to:
    determine whether the frame has reached its terminating node;

in response to the determining that the frame has reached its terminating node, check whether the second label in the label stack relates to a Generic Associated Channel Label (GAL);

in response to the second label relating to a GAL:

acquire a context descriptor constructed based on key attributes characterizing the terminated connection over which the frame has been received; and route the frame for Generic Associated Channel Header (G-ACH) processing;

wherein the context descriptor is retained by the node, separate from the frame, after the routing so that the context descriptor is available for use by an operations, administration, and maintenance (OAM) function during subsequent processing of the frame when performing connection verification (CV), continuity checking (CC), or other functions where the identity of the origin of the frame is required.

17. The node of claim 16 wherein the processing circuitry is configured to determine whether the frame has reached its terminating node by checking the first label in the label stack.

18. The node of claim 17 wherein the processing circuitry is configured to determine whether the frame has reached its terminating node by checking whether the first label is associated with a pop operation.

19. The node of claim 16 wherein the processing circuitry is configured to determine whether the frame has reached its terminating node by checking time-to-live (TTL) information received with the frame.

20. The node of claim 16 wherein the processing circuitry is configured to store the context descriptor such that storing the context descriptor comprises storing the first label for future processing by the OAM function.

21. The node of claim 20 wherein the processing circuitry is configured to store the context descriptor such that storing the context descriptor comprises storing label space information.

22. The node of claim 21 wherein the processing circuitry is configured to store the context descriptor such that storing the context descriptor comprises:

storing the first label and label space information prior to the second label being checked:

retaining the first label and label space information when the second label is a GAL;

dropping the first label and label space information when the second label is not a GAL.

23. The node of claim 21 wherein the processing circuitry is configured to store the context descriptor such that storing the context descriptor comprises storing the first label and the label space information after determining that the second label is a GAL.

24. The node of claim 20 wherein the processing circuitry is configured to store the context descriptor such that storing the context descriptor comprises storing the last processed label in a memory as a label stack history.

25. The node of claim 16 wherein the processing circuitry is configured to check the second label such that checking the second label is performed in response to a status bit being set in the received frame, the status bit indicating that the connection is a monitored connection.

26. The node of claim 16 wherein the processing circuitry is configured to store the context descriptor based on information provided in a label space of the received MPLS frame, wherein a label space is allocated to each monitored connection.

27. The node of claim 26 wherein the processing circuitry is configured to provide a separate incoming label map (ILM) table for each label space.

28. The node of claim 26 wherein the processing circuitry is configured to use a label space for a monitored connection to address a Maintenance EndPoint (MEP).

29. The node of claim 16 wherein the processing circuitry is configured to store the context descriptor such that storing the context descriptor comprises storing the context descriptor using a next hop label forwarding entry (NHFLE) key.

30. The node of claim 16 wherein the processing circuitry is further configured to:

de-multiplex the received frame to obtain data relating to OAM functions;

route the frame to a Maintenance Endpoint (MEP) based on routing information contained in the de-multiplexed data;

perform a connectivity check using the stored context descriptor.

* * * * *